UNITED STATES PATENT OFFICE.

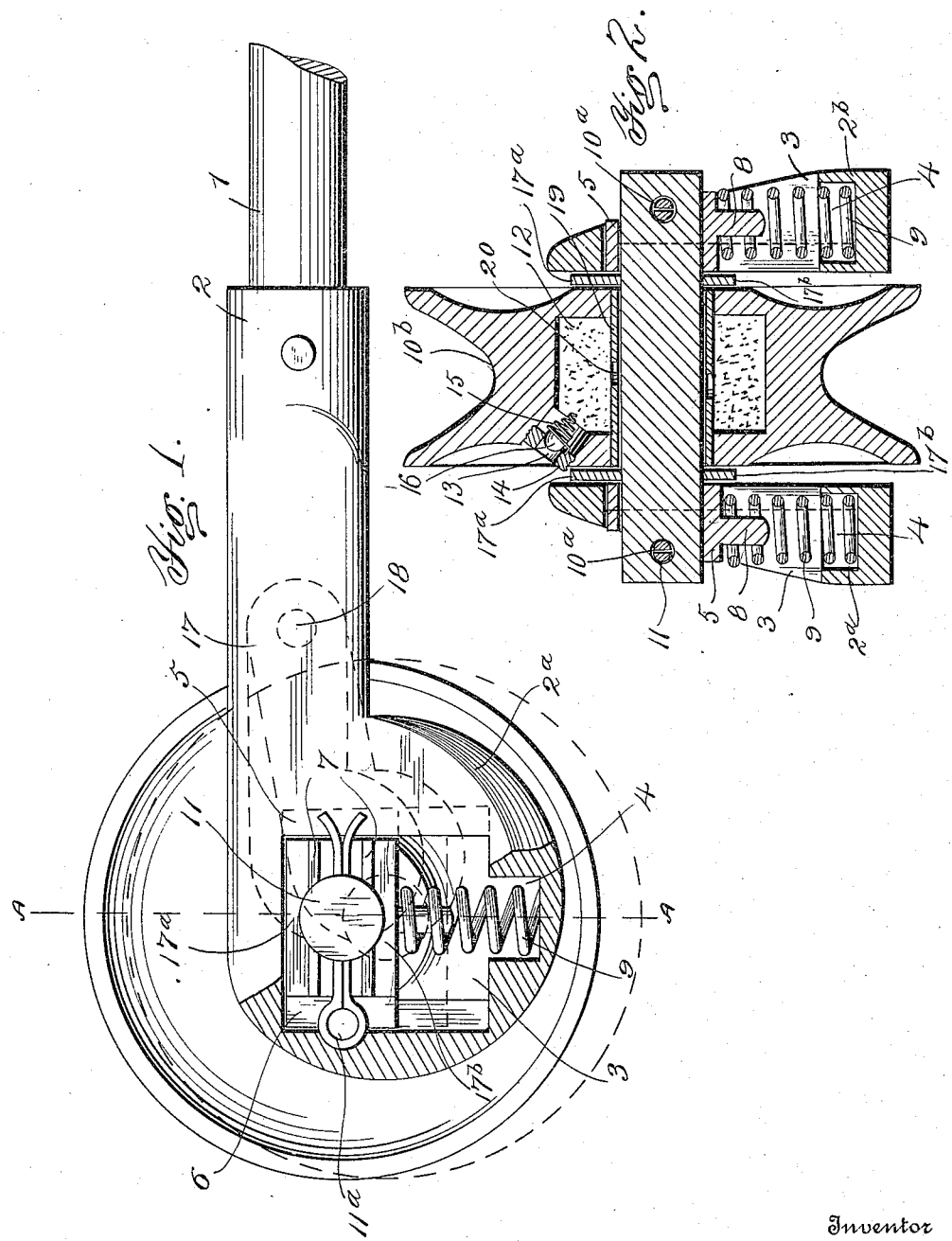

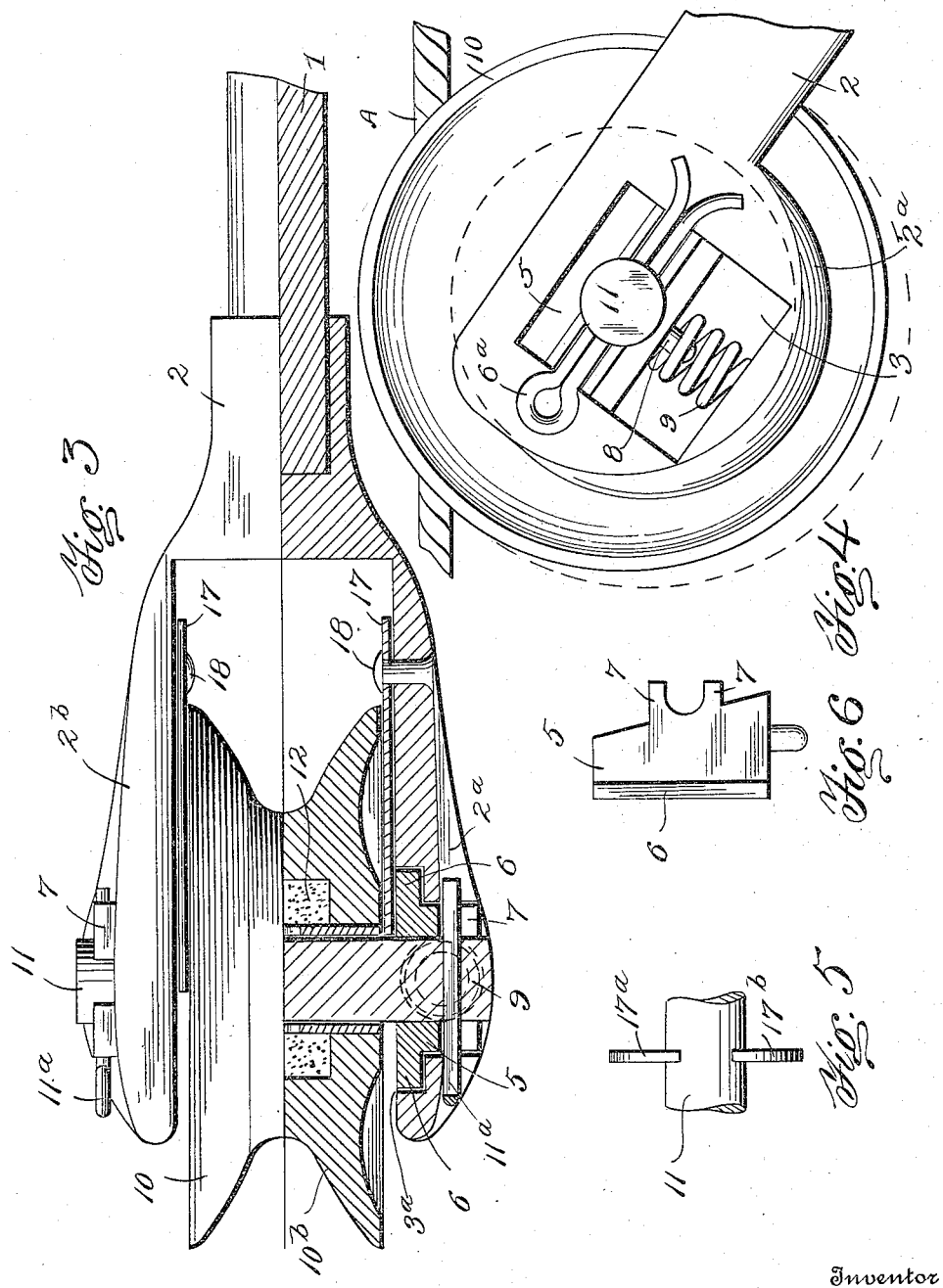

SAMUEL PARENT, OF ADAMS, MASSACHUSETTS.

TROLLEY-WHEEL MOUNT.

1,146,203. Specification of Letters Patent. Patented July 13, 1915.

Application filed June 14, 1911. Serial No. 633,193.

*To all whom it may concern:*

Be it known that I, SAMUEL PARENT, citizen of the United States, residing at Adams, in the county of Berkshire and State of Massachusetts, have invented certain new and useful Improvements in Trolley-Wheel Mounts, of which the following is a specification.

This invention relates to improvements in trolleys for electric railways and one of the objects of my invention is to provide a resilient bearing for the pole thereof which will enable the trolley to be cushioned against the uneven abutments that are often interposed at crossings and the like.

A further object of my invention is to provide a trolley wheel having an internal chamber into which a suitable lubricant may be introduced in combination with means for preventing the escape of the lubricant from said chamber as the trolley wheel revolves and means for opening said chamber for the reception of the lubricant.

With these and other objects in view my invention consists in the construction, combination, and arrangements of the various parts hereinafter described, shown in the drawings and pointed out in the appended claim.

In the drawings, Figure 1 is a side elevation and broken away to show the resilient support for the trolley and rigid rod connections therefor. Fig. 2 is an end elevation in section taken on the line A—A of Fig. 1. Fig. 3 is a top plan view partly in section and broken away to show the interior of the pulley and the resilient bearings therefor. Fig. 4 is a side elevation of the trolley engaging the conductor A and shown in the position that it assumes when in working order. Fig. 5 is a detail view of the jaws for supporting the axle bearings. Fig. 6 is a fragmental view of a guide arranged to receive a cotter pin.

1 designates a rigid rod connecting at one end to the roof of an electric car and at the other end to the sleeve 2; the sleeve 2 terminates in a bifurcated bracket composed of the parts $2^a$ and $2^b$ respectively which form a rectangular recess for the reception of the pulley which is hereinafter to be described.

The members or bosses $2^a$ and $2^b$ are substantially spherical in shape but taper from large at the bottom to small at the top, in profile each of the parts $2^a$ and $2^b$ being eccentric with respect to the axis of the pulley 10 and each formed with polysided sockets in which the resilient bearings for the axle are mounted. Each of the members is similar in form and one will be described. The boss or bracket $2^a$ is formed with a preferably square opening from side to side as shown at 3 and having a reduced socket or notch 4 to receive one end of the spring 9 and the opening 3 is formed with a square opening $3^a$ at its interior side adjacent the pulley 10, as clearly shown in Fig. 3. The object of the enlargement $3^a$ is to provide a guideway for the correspondingly shaped block 6 of the sliding support 5 the latter forming the axle box for the axle 11 upon which the pulley 10 is revolubly mounted. The axle box 5, formed of any suitable material such as brass, has a substantially central aperture $5^a$ through which the axle rod 11 passes to be securely held in position by means of the cotter pin $11^a$ engaging the contiguous sides of the said central opening 3 and is adapted to slidably engage the walls of said enlargement in the tension of the spring 9 which member acts at its bottom.

The support 5 is formed with a stud 8 which is centrally embraced by the upper end of the spring 9, which spring forms the resilient seat upon which the said bearing is mounted. The bearing 5 is also formed with a guide way bounded by the outwardly projecting ribs 7 between which the cotter pin $11^a$ passes. Owing to this construction of the resilient bearing for the pulley 10 provision is adequately made against any sudden jolt or jar imposed on the trolley pulley at crossings, so that the bearings 5 will in consequence, slide in the guide way formed by the enlargement $3^a$ which preferably extends coterminous with the square opening 3, and will be returned to its normal position when the shock has been dissipated. The pulley 10 is interposed between the offsets $2^a$ and $2^b$ of the bifurcated end of the rod and is mounted on the axle 11. After the bearings 5 shall have been inserted within the opening 3 and the spring 9 caused to rest in the reduced socket 4, the pulley 10 will be interposed between the bosses $2^a$ and $2^b$ so that its central transverse opening will register with the opening $5'$ in the bearings 5 enabling the axle 11 to pass through said openings until the apertures $10^a$ at the extremities of the axle 11 lie outside the plane of the axle box, whereupon the cotter pins 11ª will be passed therethrough at each side of the pulley. At 18 are pivoted to the inner walls of the rectangular recess formed by the offset of the bifurcated end of the trolley pole two jaw or gripping members 17 which project between the inner sides of the offsets 2ª and 2ᵇ respectively and the contiguous faces of the pulley 10 as shown clearly in Fig. 3. The gripping surfaces of the jaw members 17 are designated respectively at 17ª and 17ᵇ shown in Figs. 1 and 2. The object of these jaw members is to hold the axle 11 against any undue wabbling imparted to it by the guided axle bearings 5 and from any resistance against the movement of the bearings governed by the tension of the spring 9. The pulley 10 is interiorly formed with an opening 12 which is preferably concentric with the axle 11 and a bushing 19 embraces the axle 11 within the pulley and spaces it apart from the opening 12. The bushing 19 is formed peripherally within the plane of the opening 12 with apertures 20 drilled through so that the graphite or other pulverulent lubricant with which said opening is filled may readily enter the apertures 20 and keep the surface of the axle well lubricated.

14 is a screwthreaded collar removably mounted in the pulley 10 and leading into the graphite reservoir 12, a suitable opening being drilled clear through the side of the pulley in the said reservoir. The spring 15 carries a button or plunger 16 mounted in the conventional manner. The enlargement of the opening 13 conducts to the mouth of the opening 12 and normally the button 16 will be urged in a rigid joint co-acting with the mouth of the opening 13 to close the same but may readily be pressed inward to provide clearance for filling the reservoir with graphite. The pulley 10 has a grooved periphery shown at 10ᵇ providing a guide way for the stringed wires or conductors a.

The trolley comprising the pulley 10, the resilient bearing located within, the offsets 2ª and 2ᵇ and the gripping members 17 provide a suitable pivoted device for an electric railway and it will be understood that the rigid rod 2 occupies an oblique position as shown in Fig. 4. The trolley is accustomed at frequent intervals to receive an impact from protuberances connected to the stringed wires or conductors at various crossings and the jar or jolt will be taken up by the springs 9 causing the pulley 10 to be resiliently supported upon the slidable axle boxes 5.

Various modifications may be resorted to without departing from the spirit of my invention or the details of construction disclosed above and I do not mean to be restricted thereto.

I claim and desire to secure by Letters Patent:—

A trolley harp comprising a pole, a bifurcated part carried by said pole, an axle mounted in said bifurcated parts and projecting beyond opposite sides thereof, thickened bosses joined upon the free ends of the arms of said bifurcated portion, two blocks forming axle bearings, each of said blocks consisting of a rectangular piece, a reduced integral forwardly extending and downwardly inclined part formed on each block, each of said bosses being formed with socket openings corresponding in shape to said blocks and arranged to receive the same, two horizontally extending and projecting ribs formed on each block, a stud depending from each block, a spring mounted in the socket opening of each boss, each of said blocks seating on one of said springs said axle passing through said blocks and a cotter pin engaging each end of said axle, being disposed between a pair of said ribs whereby said cotter pin is held against displacement.

In testimony whereof I affix my signature in presence of two witnesses.

SAMUEL PARENT.

Witnesses:
JAMES N. YOUNG,
ANDREW M. CHALMERS.

Copies of this patent may be obtained for five cents each, by addressing the "Commissioner of Patents, Washington, D. C."